(12) United States Patent
Xu et al.

(10) Patent No.: US 10,341,325 B2
(45) Date of Patent: Jul. 2, 2019

(54) SYSTEM AND METHOD FOR TRANSFERRING DEVICE IDENTIFYING INFORMATION

(71) Applicant: VMware, Inc., Palo Alto, CA (US)

(72) Inventors: Emily Hong Xu, Palo Alto, CA (US); Lloyd Spencer Evans, Auburn, CA (US); Lakshman Rao Abburi, Pleasanton, CA (US); Tomas Boman, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 89 days.

(21) Appl. No.: 15/197,997

(22) Filed: Jun. 30, 2016

(65) Prior Publication Data

US 2017/0223012 A1    Aug. 3, 2017

Related U.S. Application Data

(60) Provisional application No. 62/288,928, filed on Jan. 29, 2016.

(51) Int. Cl.
*H04L 29/06* (2006.01)
*G06F 16/9535* (2019.01)
*G06F 16/2455* (2019.01)
*G06F 21/33* (2013.01)
*G06F 21/73* (2013.01)

(52) U.S. Cl.
CPC .... *H04L 63/0823* (2013.01); *G06F 16/24552* (2019.01); *G06F 16/9535* (2019.01); *G06F 21/33* (2013.01); *G06F 21/73* (2013.01); *H04L 63/0807* (2013.01); *H04L 63/0815* (2013.01)

(58) Field of Classification Search
CPC .......... H04L 63/0823; H04L 63/0807; H04L 63/0815; G06F 17/3048; G06F 17/30867
See application file for complete search history.

(56) References Cited

U.S. PATENT DOCUMENTS

| | | | |
|---|---|---|---|
| 2004/0167984 A1* | 8/2004 | Herrmann | H04L 63/08 709/229 |
| 2006/0041761 A1* | 2/2006 | Neumann | G06F 21/32 713/189 |
| 2011/0321152 A1* | 12/2011 | Tor | H04L 63/102 726/12 |
| 2015/0096010 A1 | 4/2015 | Pollutro et al. | |
| 2015/0271013 A1 | 9/2015 | Singh et al. | |

(Continued)

FOREIGN PATENT DOCUMENTS

WO    2015154066 A1    10/2015

OTHER PUBLICATIONS

International Search Report and Written Opinion for PCT/US2017/035172 dated Sep. 12, 2017.
Office Action dated Apr. 6, 2018 for U.S. Appl. No. 15/168,394.

*Primary Examiner* — Tri M Tran
(74) *Attorney, Agent, or Firm* — Thomas Horstemeyer, LLP

(57) ABSTRACT

Disclosed are various examples for determining whether a client device complies with compliance rules while authenticating a user account. A client certificate can include an identifier corresponding to a client device. An identity provider can extract the identifier while authenticating the user account. The identity provider can determine whether the client device complies with compliance rules prior to authenticating the user account on the client device.

20 Claims, 6 Drawing Sheets

(56) References Cited

U.S. PATENT DOCUMENTS

| | | |
|---|---|---|
| 2015/0295892 A1 | 10/2015 | Fox |
| 2016/0052595 A1 | 2/2016 | Dommsch |
| 2016/0191567 A1* | 6/2016 | Chahal ................. H04W 12/00 726/1 |
| 2016/0285858 A1* | 9/2016 | Li ....................... H04L 63/0815 |
| 2016/0292694 A1* | 10/2016 | Goldschlag ............. H04L 63/20 |
| 2017/0223012 A1 | 8/2017 | Xu |

\* cited by examiner

SYSTEM AND METHOD FOR TRANSFERRING DEVICE IDENTIFYING INFORMATION

CROSS-REFERENCE TO RELATED APPLICATIONS

This application claims the benefit of U.S. Provisional Application No. 62/288,928, filed Jan. 29, 2016, the entire contents of which are hereby incorporated herein by reference.

BACKGROUND

Companies use device management systems to control client devices used to access company resources. The device management system can manage and control client devices that are enrolled with the device management system. The device manager can ensure employees are productive or ensure that employees comply with corporate policies. The device management system can provide data segregation, secure emails, secure corporate documents, and enforce corporate policies. The device management system can distribute applications over a network and data and configuration settings for all types of client devices, including mobile phones, smartphones, and tablet computers.

A company can also use an identity provider system to authenticate user accounts. For example, a user on a client device can log on to a user account on the identity provider. The identity provider system can provide the user access to resources based on the permissions of the user account. The identity provider system can be responsible for providing identities for users that interact with a corporate resources. The identity provider system can also assert to other service providers that the identity of a user is known to the identity provider system.

However, the identity provider system lacks the ability to ensure that a client device is in compliance with corporate policies and rules. The identity provider system can only ensure that a user account is authorized to access a resource regardless of what client device is being used. As such, the identity provider system is unable to ensure the client device is enrolled and managed with a device management system as well as compliant with the corporate policies and rules when authenticating a user account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to transferring identifying information of a client device to an identity provider. The identity provider can receive an authentication request from a client device, possibly including an authentication credential. As an example, a software application executed on the client device may request authentication from the identity provider including a username and password. The identity provider can request that the client negotiate a ticket with a key distribution center. Once a ticket is received from the client device, the identity provider can extract an identifier from the ticket. The identity provider can query a management service using the device identifier to determine whether the client device satisfies compliance rules prior to authenticating the user.

Figure 1:
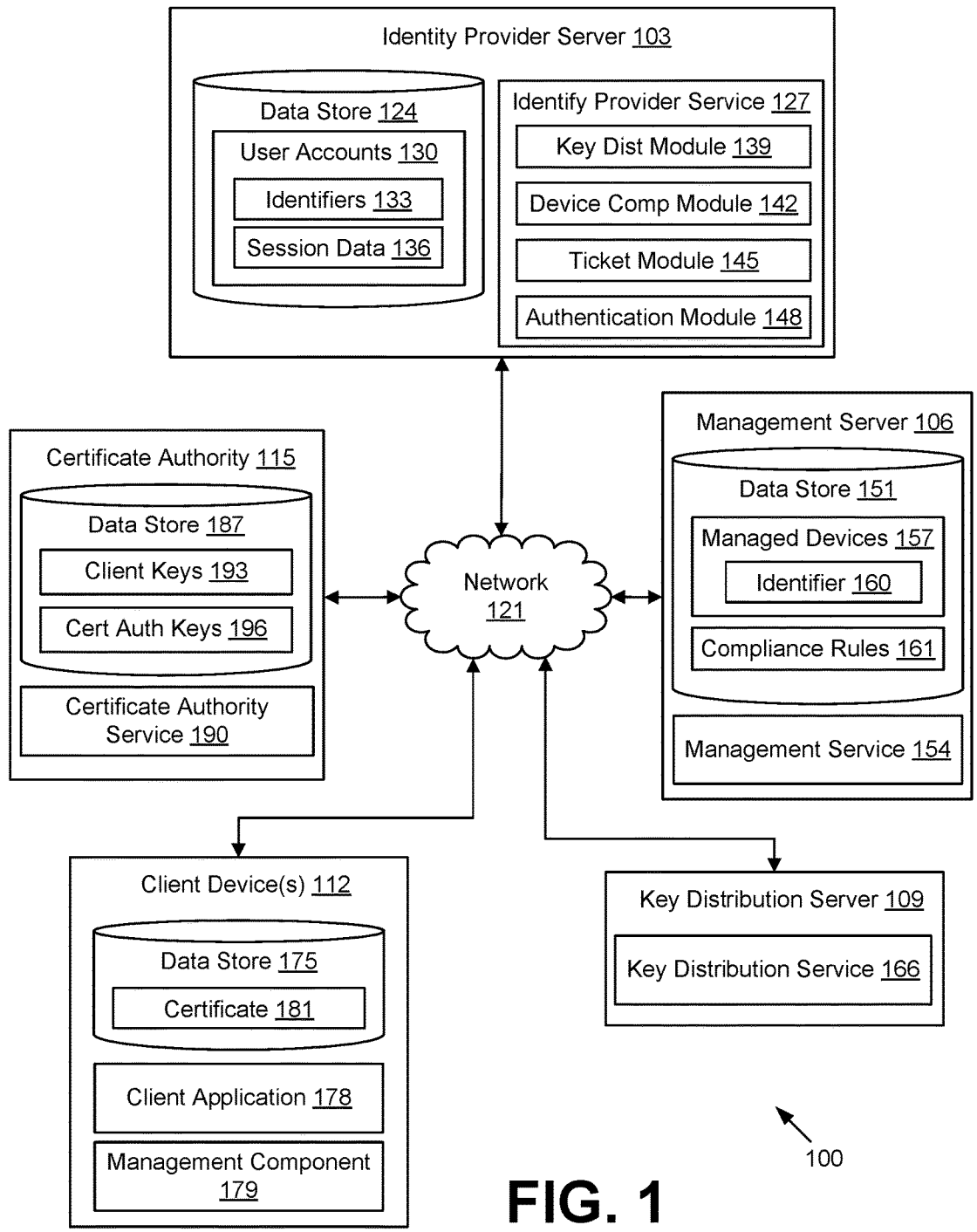
FIG. 1 is a drawing of a networked environment according to various examples of the present disclosure.

With reference to FIG. 1, shown is a networked environment 100 according to various examples. The networked environment 100 includes an identity provider server 103, a management server 106, a key distribution server 109, a client device 112, and a certificate authority 115, each of which is communicably coupled through a network 121.

The identity provider server 103 can include a data store 124 and an identity provider service 127. The data store 124 can store user accounts 130 that include identifiers 133 and session data 136. The identity provider service 127 can execute add-on software modules to add additional functionality. As an example, the identity provider service 127 can execute a key distribution module 139, a device compliance module 142, a ticket module 145, an authentication module 148, and other add-on modules.

The management server 106 can include a data store 151 with a list of managed devices 157, each of which includes a corresponding identifier 160. The data store 151 can also include one or more compliance rules 161.

The management service 154 can manage and oversee the operation of one or more client devices 112. The management service 154 can manage access to resources for a user account from various client devices 112. That is, the management service 154 can determine whether a user, a device, or a pairing of a user and a device are authorized to access resources based on access rights. In one example, access rights are compliance rules 161 that can be determined at the time of the access request.

The management service 154 can facilitate enrollment of a client device 112 on behalf of a user account. In one example, an employer can operate the management service 154 to ensure that the client devices 112 of its employees operate in compliance with the security policies. In another example, an employer can configure the management service 154 to enforce different policies (or no policies at all) based upon which users or employees are currently logged into or otherwise operating the client device 112. The management service 154 can also facilitate access to email, calendar data, contact information, and other resources accessible on the client device 112.

The managed devices 157 portion of the data store 151 can include information regarding the client devices 112 that are managed and controlled by the management service 154. A managed device 157 entry in the data store 151 can correspond to a particular client device 112 and include, for example, an identifier 160 for the client device 112, the identification of a user assigned to the client device 112, whether a management component 179 is installed on the client device 112, an identification of applications that are installed in the client device 112, historical data regarding the operation of the client device 112, a list of profiles installed on the client device 112, an indicia of enrollment on the client device 112, geographic locations and time periods that the client device 112 is configured to be operable, and other information.

In addition, the managed device 157 entry for a particular client device 112 can include one or more device profiles. A device profile can include settings embodied in a file. When a device profile is installed on a client device 112, the client device 112 can force functions or applications executed on the client device 112 to adhere to the settings embodied in the file. The managed device 157 entry can also include a set of compliance rules 161 that can be specified by the management service 154. The management service 154 can assign various compliance rules 161 to a client device 112, a user account associated with the client device 112, or to a pairing of the client device 112 and the user account associated with the client device 112.

The compliance rules 161 can specify conditions that must be satisfied for a client device 112 to be deemed compliant with the compliance rule 161. In one example, a compliance rule 161 can specify that particular applications are prohibited from being installed on a client device 112. In another example, a compliance rule 161 can specify that a lock screen is required to be generated when the client device 112 is "awoken" from a low power (e.g., "sleep") state and that a passcode is required for a user to unlock the lock screen. In yet another example, the compliance rule can specify that the operating system not be modified, such as being rooted or jail broken.

Additionally, some compliance rules 161 can be based on time, hardware configuration, software configuration, geographical location, network properties, or other predefined conditions.

When the compliance rules 161 for a particular device profile are satisfied, the management service 154 can determine that the corresponding client device 112 is compliant with the device policy. According to one example, a client device 112 can fail to satisfy a compliance rule 161 if an agent is not installed on the client device 112, and access to resources through the client device can be prohibited until the agent is installed and the compliance rule 161 is satisfied. In yet another example, the client device 112 can satisfy a compliance rule 161 when a client device 112 is located within a particular geographic location. In one example, a client device 112 can satisfy a compliance rule 161 when the client device 112 is in communication with a particular network 121, such as a particular local area network that is managed by the management service 154. Furthermore, a compliance rule 161 in another example can be satisfied upon the time and date matching specified values.

Another example of a compliance rule 161 can involve determining whether a user belongs to a particular group of authorized users. A compliance rule 161 can include a whitelist or a blacklist that specifies whether particular users or groups of users are authorized users. In various examples, the management service 154, the client device 112, or a combination of both the management service 154 and the client device 112 can determine whether a client device 112 satisfies a compliance rule 161.

As yet another example, a compliance rule 161 can involve detecting whether an unauthorized application is installed on the client device 112, determining whether an agent, container, application profile, or device management profile has been removed from the client device 112, determining whether the certificate has expired, or determining whether the client device 112 is located within a geo-fence. If a client device fails to satisfy a compliance rule 161, a remedial action can be taken.

In some cases, network resources can be accessed by the computing device 112 only if certain compliance rules 161 are met for the user account 130, the computing device 112, the network 121, other device or network operating factors, or some combination thereof. For example, the compliance rules 161 can include various compliance rules associated with individual users, groups of users, devices, groups of devices, communications networks, and other factors. The management service 154 can permit or deny access to one or more resources depending upon who is seeking to access the resources, what client devices 112 are used to seek access to the resources, and over what networks the client devices 112 are seeking to access to the resources, among other compliance rules 161. As other examples, the compliance rules 161 can include rules associated with the operating parameters or operating conditions of the client device 112, among others. The management service 154 can permit or deny access to one or more resources depending upon the operating status of the client device 112. In that sense, the client device 112 incorporates additional aspects of compliance-only access to the resources.

The compliance rules 161 include certain profile, credential, compliance, and other parameters or rules associated with access to resources. The compliance rules 161 can define requirements for users of the client device 112, requirements of client device 112, requirements of the network 121, and other device or network operational requirements of factors. For example, the compliance rules 161 can define whether or not a certain class or category of users, certain client devices 112, or certain networks can be used to access one or more resources. The management service 154 can refer to the compliance rules 161 to determine when and how to perform content access control and authentication procedures.

The compliance rules 161 can also define the enforcement of certain remedial actions in the event that the management service 154 blocks access to any of the resources or the user account 130 fails the authorization process. Remedial actions can be taken under various circumstances based on the compliance rules 161, such as when an operating system of the client device 112 is jailbroken (e.g., rooted or modified), when an unauthorized application, such as a blacklisted application or an application known to include malware, is detected on the client device 112, when one or more mobile device management profiles or agents have been removed from the client device 112, when an application or service profile is removed from the client device 112, when user identity verification or credentials fail to meet compliance rules, or when the client device 112 is not compliant with certain geographical or location-based requirements, among other situations.

In some examples, a company can operate the management service 154 to ensure that the client devices 112 of its users satisfy respective compliance rules 161. By ensuring that the client devices 112 of its users are operating in compliance with the compliance rules 161, the company can control access to resources to thereby improve the security of client devices 112 associated with the company and the users of the client devices 112.

The key distribution server 109 can execute a key distribution service 166. The key distribution service 166 can be, for example, a Kerberos Key Distribution Center (KDC).

The key distribution service 166 can supply a ticket, such as session tickets and temporary session keys, to client devices 112 and user accounts 130. A management component 179 executed on the client device 112 can send a certificate to the key distribution service 166 to authenticate the client device 112. The key distribution service 166 can verify the certificate is valid and issue a ticket to the management component 179. To verify the certificate is valid, the key distribution service 166 can determine that the certificate is signed by the certificate authority 115. The key distribution service 166 can also ensure data within the certificate is valid. As an example, the key distribution service 166 can determine whether the certificate has expired based on a time range specified in the certificate.

The key distribution service 166 can extract an identifier from the certificate. The management server 106 can use the certificate authority 115 to generate a certificate that includes the identifier 160 that corresponds to a client device. The key distribution service 166 can extract this identifier from the certificate. In one example, the ticket module 145 extracts the identifier from the ticket. The ticket module 145 can pass the identifier and username to the authentication module 148. The identifier can be embedded within the certificate as a property. As an example, the identifier can be stored in a Domain Name Server Subject Alternate Name field in the certificate. As such, if the value of the identifier is maliciously changed, the digital signature from the certificate authority 115 will not match and the key distribution service 166 will reject the certificate. When generating the ticket for the client device 112, the key distribution service 166 can embed the identifier into the ticket. The key distribution service 166 can send the generated ticket including the identifier to the management component 179 when the certificate is valid.

In one example, a key distribution service 166 can be executed for each domain controller. For example, the key distribution service 166 can be part of an Active Directory Domain Services (AD DS). In another example, the key distribution service 166 can be a cloud-based service. In this example, a single key distribution service 166 can be associated with multiple domain controllers simultaneously.

The client device 112 can include a data store 175, a client application 178, and a management component 179. The data store 175 can include a certificate 181 corresponding to the client device 112. The management component 179 can locally manage the client device 112 and facilitate remote management by the management service 154. The client application 178 can include third party applications such as productivity applications, messaging applications or other applications. The client application 178 can read and write to the data store 175. The client device 112 can receive a certificate from the management service 154. The management component 179 can store the certificate as certificate 181 in the data store 175.

According to one example, the management service 154 and management component 179 can restrict the client application 178 from accessing some or all of the data store 175 if the client device fails to comply with a compliance rule 161. The management component 179 can act as an agent on the client device 112 for the management service 154. In one example, the client application 178 is still able to read the certificate 181 when failing to comply with a compliance rule 161. The client application 178 can query the management service 154 or management component 179 to determine permissions for the user account. As an example, the management component 179 or management service 154 can determine that a user account is not authorized if a compliance rule 161 corresponding to the client device 112 is not satisfied.

The certificate authority 115 can include a data store 187 and a certificate authority service 190. The data store 187 can include client keys 193 and certificate authority keys 196. The certificate authority keys 196 can include a private key and a public key. The certificate authority service 190 can share the pubic key with other network devices, such as the identity provider server 103, management server 106, the key distribution server 109, and one or more client devices 112. The certificate authority service 190 can store the private key securely in the data store 187 without sharing the private key. The certificate authority service 190 can receive a request to generate a certificate from the management service 154. In one example, the certificate authority 115 is connected to a private network accessible by management service 154. In this example, the certificate authority service 190 can rely on the physical security of the private network to ensure only authorized services can generate certificates.

When a request is received to generate a certificate, the certificate authority service 190 can generate a certificate based on data contained in the request. As an example, the request to generate a certificate can include the identifier 160 corresponding to the client device 112 for which the certificate is being generated. The request can also include a duration for which the certificate will be valid, descriptive text indicating a purpose for the certificate, identifying information for the issuer of the certificate, identifying information for the intended client device 112 of the certificate, and other information. The identifying information for the intended client device 112 can include an internet protocol (IP) address of the client device 112. The certificate authority 115 can store the generated certificate in client keys 193. Alternatively in some examples, the client keys 193 are not stored in the data store 187.

The management service 154 can generate a certificate for a client device 112 that includes an identifier 160 corresponding to the client device 112. The management service 154 can issue a signed certificate to any of the managed devices 157. The management service 154 can send the certificate to the client device 112 to be stored in the data store 175 as a certificate 181. As an example, management service 154 can send a message to the certificate authority service 190 instructing the certificate authority service 190 to generate a certificate, such as a client key 193, for a specific client device 112. The client key 193 can include a private key and a public key. The certificate authority service 190 can sign the client key 193 with a certificate authority key 196 to create a certificate. In one example, the certificate authority service 190 uses a private key from the certificate authority key 196 to generate a certificate by signing the public key of the client key 193.

The management component 179 can send an authentication request to the identity provider service 127. The authentication request can include authorization credentials, such as, for example, a username and password. The authentication request can also include biometric information, such as fingerprint data, retinal data, or other biometric information. The authentication module 148 can extract the authentication credentials from the authentication request and forward the request to the key distribution module 139.

The identity provider service 127 can send a request to the management component 179 to send the certificate 181 to the key distribution service 166. As an example, the identity provider service 127 can send an HTTP 401 Authorization Required command to the management component 179. The command can specify a scheme used to authenticate, including a network address of the key distribution service 166. For example, the command can specify that a certificate should be sent to the key distribution service 166 in order to obtain a ticket. The command can be sent by the key distribution module 139. In one example, the request sent is a redirect command. In response receiving the request, the management component 179 can send the certificate 181 to the key distribution service 166. The management component 179 can send a certificate including an identifier to the key distribution service 166.

The key distribution service 166 can extract the identifier from the certificate 181. The key distribution service 166 can generate a ticket that includes the identifier and send the ticket to the management component 179. The management component 179 can send the ticket to the identity provider service 127, and the identity provider service 127 can extract the identifier from the ticket.

The identity provider service 127 can determine whether the authentication credentials received from the client device 112 authenticate against a user account 130 in the data store 124. As an example, the identity provider service 127 can execute a hashing algorithm on the user supplied password. The identity provider service 127 can search the data store 124 for a user name corresponding to a user account 130. The identity provider service 127 can compare a stored hashed password to the hashed password provided in order to authenticate the user account. Further, the identity provider service 127 can determine whether the client device 112 complies with compliance rules 161 using the extracted identifier. The identity provider service 127 can authenticate one or more client applications 178 for access to the user account 130 if the authentication credentials match a user account 130 and the client device 112 complies with the compliance rules 161.

To determine whether the client device 112 complies with the compliance rules 161, the identity provider service 127 can query the management service 154. The device compliance module can send the query to the management service 154. In one example, the identity provider service 127 sends a network request to a representational state transfer application programming interface (REST API) of the management service 154. The request can be sent by the device compliance module 142. The network request can include the identifier that was extracted from the ticket. Communications over the network 121. between the management service 154 and the identity provider service 127 can be encrypted. The management service 154 and identity provider service 127 can share a key and a certificate. The identity provider service 127 can include the certificate in the network request to the REST API. The management service 154 can validate the certificate using the shared key prior to responding to the network request with a status of whether the client device 112 complies with compliance rules 161.

The identity provider service 127 can cache the identifier and session data in a data store 124 associated with the user account 130 as identifiers 133 and session data 136. The session data 136 can include a most recent status of whether the client device 112 complies with compliance rules 161. The identity provider service 127 can poll the management service 154 for an updated status of whether the client device 112 complies with the compliance rule 161. The poll can be periodically sent by the identity provider service 127. The identity provider service 127 can also query for the status upon receipt of a request to authenticate through the identity provider service 103. The management service 154 can determine whether the client device 112 complies with the compliance rules and send the result to the identity provider service 127. The identity provider service 127 can update the session data in the data store with the updated status. The network environment 100 can also include one or more service providers 206, as shown in FIG. 2.

Figure 2:
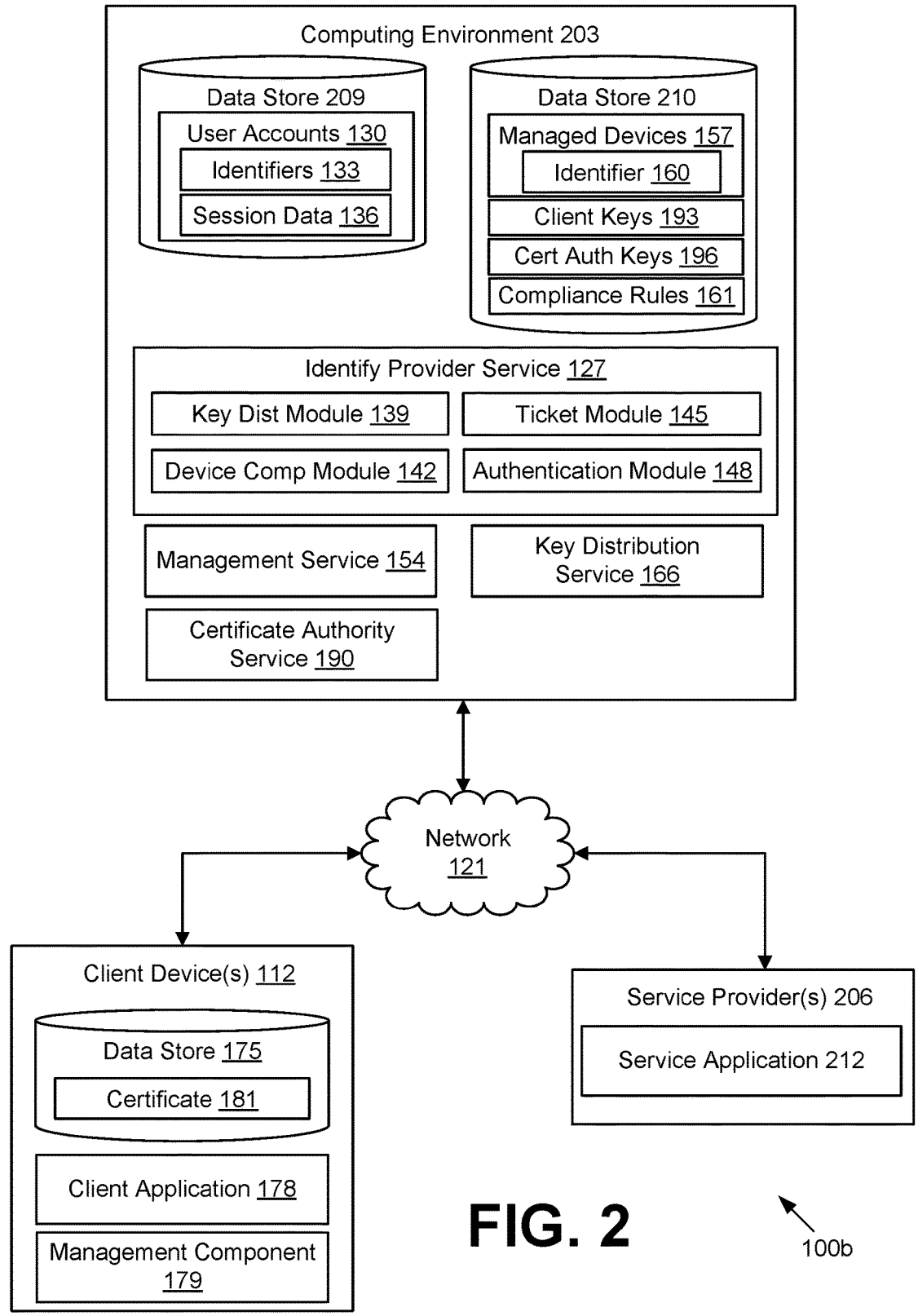
FIG. 2 is a drawing of a networked environment according to various examples of the present disclosure

With reference to FIG. 2, shown is an example of the networked environment 100b according to various examples. The networked environment 100b includes computing environment 203, a service provider 206, and one or more client devices 112. Shown in the networked environment 100b, the identity provider service 127, the management service 154, the key distribution service 166, and certificate authority service 190 from FIG. 1 are executed in a single computing environment 203. The computing environment 203 also includes a data store 209 that stores the user accounts 130 and a data store 210 that stores the managed devices 157, the client keys 193, and the certificate authority keys 196. In one example, the data store 209 stores the client keys 193 and certificate authority keys 196.

The identity provider service 127 can receive a log in request including a user account from a service application 212, such as, for example, a single sign on (SSO) request. The identity provider service 127 can generate a token, such as an SSO token, that includes a current status of whether the client device 112 complies with compliance rules 161. The determination can be based on session data 136 in either data store 124 or data store 209. As an example, the identity provider service 127 can query the data store 124 or 209 using the user account from the log in request to determine a stored status in the session data 136. The identity provider service 127 can send the token to the service provider 206 to authenticate the user account 130. In one example, the status put into a security assertion markup language (SAML) attribute field of a SSO token. In another example, the status is stored as an OAuth2 token attribute. In yet another example, the status is stored as an OpenID Connect token attribute.

Figure 3:
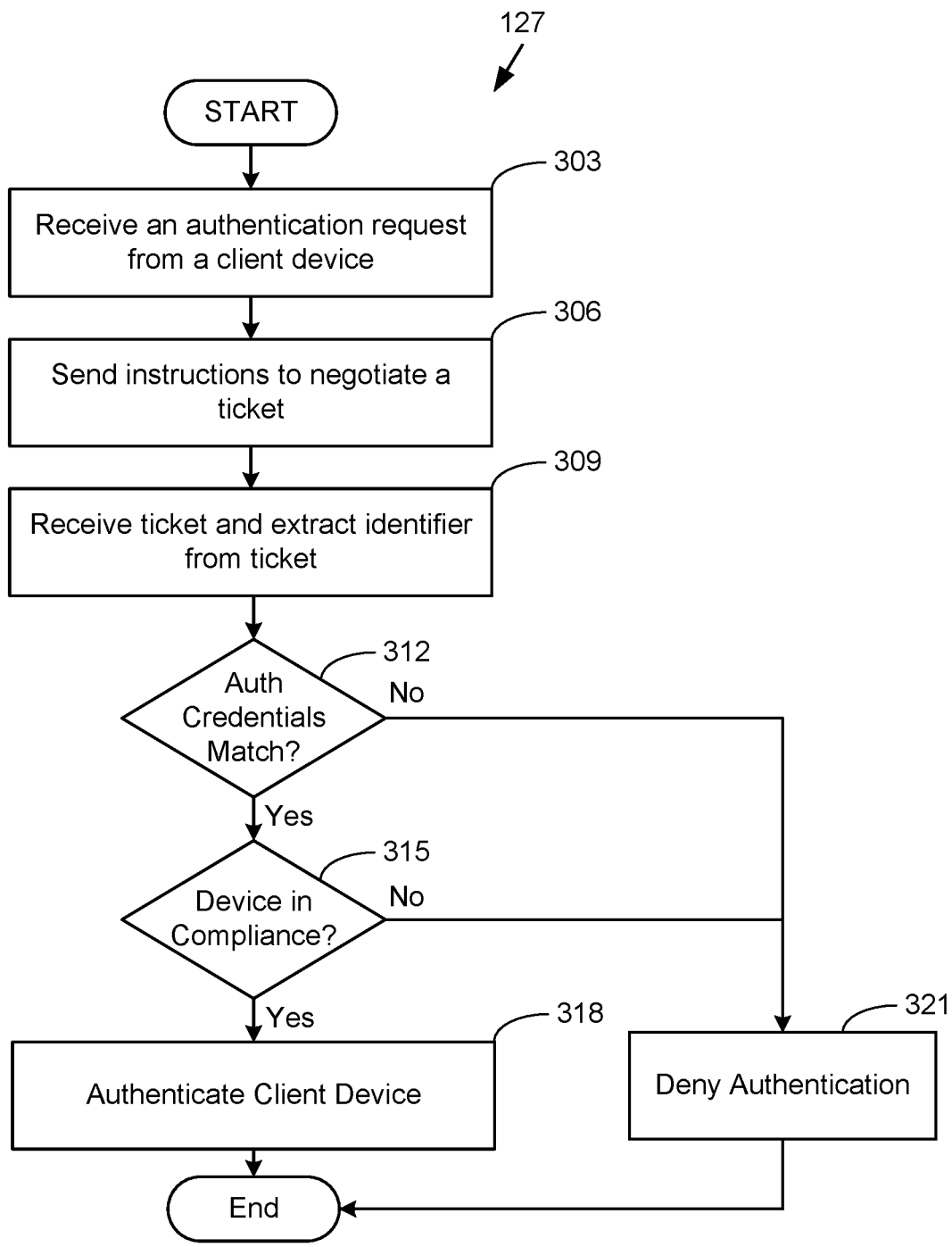
FIG. 3 is a flowchart illustrating examples of functionality implemented as portions of an identity provider service.

Referring next to FIG. 3, shown is a flowchart that provides one example of the operation of a portion of the identity provider service 127. As an alternative, the flowchart of FIG. 3 can be viewed as depicting an example of elements of a method implemented in the identity provider server 103 or the computing environment 203. FIG. 3 illustrates an example of how the identity provider service 127 can ensure a client device 112 complies with compliance rules 161 when authenticating a user account 130 for use by one or more client applications 178 on the client device 112.

At step 303, the identity provider service 127 can receive an authentication request from a management component 179 executed on a client device 112. The authentication request can include an authentication credential. For example, a user of the client device 112 can enter a username and password on a user interface on the client device 112. The username and password can be sent to the identity provider service 127 as part of the authentication request. The authentication module 148 can extract the authentication credentials from the authentication request and forward the request to the key distribution module 139.

At step 306, the identity provider service 127 can send instructions to the management component 179 to negotiate a ticket with a key distribution service 166. As an example, the identity provider service 127 can send an HTTP 401 Authorization Required command to the management component 179. The command can specify a scheme used to authenticate include a network address of the key distribution service 166. For example, the command can specify that a certificate should be sent to the key distribution service 166 in order to obtain a ticket. The command can be sent by the key distribution module 139.

At step 309, the identity provider service 127 can receive a ticket from the management component 179. The management component 179 can receive a ticket from the key distribution service 166. The management component 179 can send the ticket to the identity provider service 127. The identity provider service 127 can extract an identifier from the ticket. In one example, the ticket module 145 extracts the identifier from the ticket. The ticket module 145 can pass the identifier and username to the authentication module 148.

At step 312, the identity provider service 127 can determine whether authentication credentials provided by a management component 179 match against a user account 130. In one example, the authentication credentials are a username and password. The identity provider service 127 can search the user accounts 130 for the username and validate the password against the user account 130. The identity provider service 127 can evaluate an access policy for the user account 130 to determine whether the client device 112 is authorized for access. If the authentication credentials match, the identity provider service 127 proceeds to step 315. If the authentication credentials fail to match, the identity provider service 127 proceeds to step 321.

According to one example, when the number of times a user account 130 fails meets a threshold, the identity provider service 127 or the management service 154 can lock the client device 112. As an example, the client device 112 can require that a user enters a passcode before being able to use the client device 112. The identity provider service 127 or the management service 154 can block the client device 112 from accessing local or remote services, uninstall profiles from the client device 112, delete or wipe all data from the client device 112, un-enroll the client device 112 from the management service 154, delete an agent from the client device 112, or perform another remedial action.

At step 315, the identity provider service 127 determines whether the client device 112 is in compliance with compliance rules 161. The identity provider service 127 can send a request to the management service 154 to determine whether the client device 112 complies with the compliance rules 161. The request can include the identifier extracted from ticket. The identity provider service 127 can send the request to a REST API of the management service 154. The request can be sent by the device compliance module 142. The management service 154 can send the status of whether the client device 112 complies with the compliance rules 161 in response to the request from the identity provider service 127. If the identity provider service 127 determines that the client device 112 complies with the one or more compliance rule 161, the identity provider service 127 proceeds to step 318. Otherwise, the identity provider service 127 proceeds to step 321.

At step 318, the identity provider service 127 authenticates the client device 112. As an example, the identity provider service 127 can send an authentication confirmation message to the management component 179. The identity provider service 127 can authorize the client device 112 to access the user account 130.

At step 321, the identity provider service 127 denies authorization for the client device 112. The identity provider service 127 can send a message denying access to the user account 130 to the management component 179. In one example, the identity provider service 127 can block further communication with the client application 178 or the management component 179. The communication can be blocked when a number of authentication attempts meets a predefined threshold. Thereafter, the process proceeds to completion.

Figure 4:
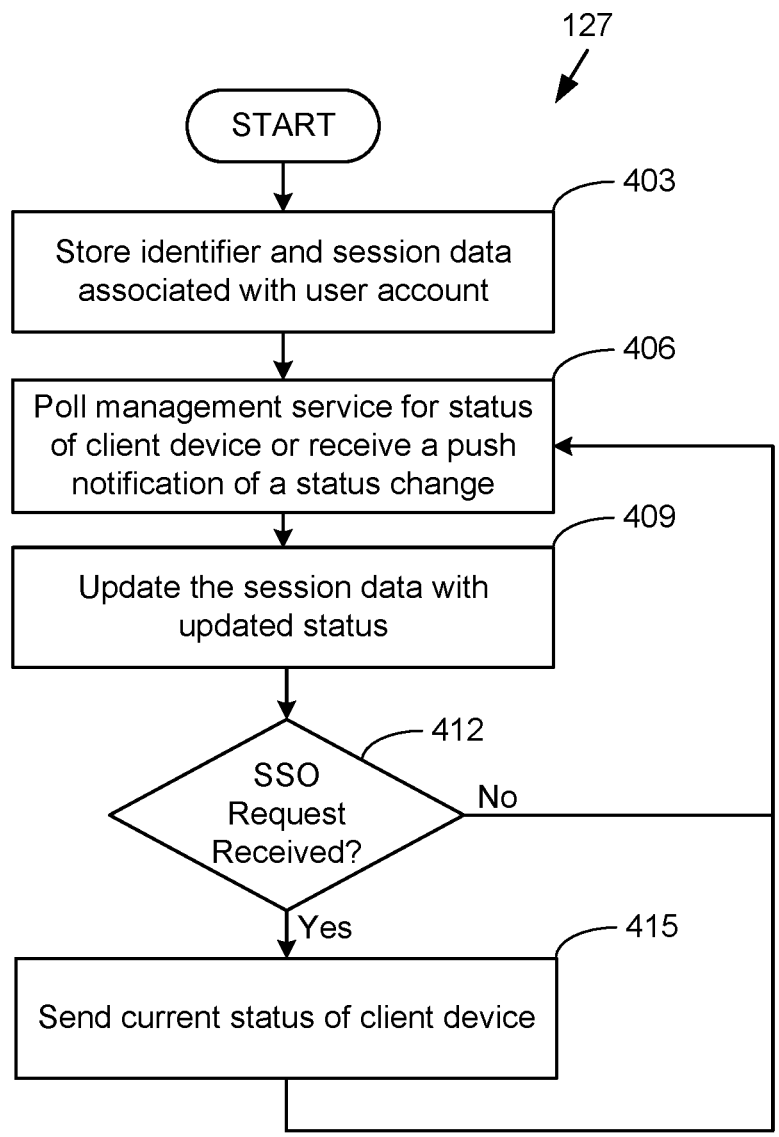
FIG. 4 is a flowchart illustrating examples of functionality implemented as portions of an identity provider service.

Referring next to FIG. 4, shown is a flowchart that provides one example of the operation of a portion of the identity provider service 127. As an alternative, the flowchart of FIG. 4 can be viewed as depicting an example of elements of a method implemented in the identity provider server 103 or the computing environment 203. FIG. 4 illustrates an example of how the identity provider service 127 can ensure a client device 112 complies with compliance rules 161 when authenticating a user account 130 for a service provider 206.

At step 403, the identity provider service 127 can store an identifier 133 and session data 136 associated with a user account 130 in a data store 124 or 209. The identity provider service 127 can cache the status of whether a client device 112 complies with compliance rules 161 in session data 136. The identifier for the client device 112 can also be stored in identifier 133.

At step 406, the identity provider service 127 can poll the management service 154. The identity provider service 127 can iterate through each of the user accounts 130. For each user account 130 that has a corresponding identifier 133, the identity provider service 127 polls the management service 154 using the identifier for a status of the respective client device. As an example, the identity provider service 127 can determine whether the client device 112 complies with compliance rules 161, as discussed in step 315.

In other examples, the management service 154 can push the status of one or more client device 112 to the identity provider service 127. As an example, the identity provider service 127 can receive a push notification of a status change. When the management service 154 detects a change in the status of a client device 112, the management service 154 can send a push notification to the identity provider service 127.

At step 409, the identity provider service 127 can update the session data 136 with a status of whether a client device 112 complies with compliance rules 161. In one example, the status stored in session data 136 can be replaced with the updated status determined in step 406. In another example, the session data 136 includes a history of past statuses. The identity provider service 127 can append the updated status to the history of past statuses. In one example, the identity provider service 127 only appends the updated status when the updated status is different than the last stored status in the session data 136. The session data 136 can include a timestamp of the last poll for each of the user accounts 130.

At step 412, the identity provider service 127 can receive a single sign-on request from a service provider 206. A service provider 206 can submit a request to authenticate a user account to the identity provider service 127. The request can be a single sign-on request. The request can include a username for a user account 130. If the request is received, the identity provider service 127 proceeds to step 415. Otherwise, the identity provider service 127 can proceed to step 406.

At step 415, the identity provider service 127 can send the current status of the client device 112 to the service provider 206. The identity provider service 127 can look up the status in the session data 136 for the user account 130 being authenticated. The identity provider service 127 can embed the status in an authentication token. The identity provider service 127 can send the authentication token to the service provider 206 including the status of whether the client device 112 complies with the compliance rules 161. Thereafter, the process proceeds to completion.

According to one example, if a client device 112 uses an unsecure communication channel for a service that requires a secure communication channel, the status can indicate that the client device 112 fails to satisfy a compliance rule 161 that requires the secure communication channel. In addition, the identity provider service 127 can send a notification to the client device 112 to inform the user of the non-compliance. The identity provider service 127 or the management service 154 can also lock the client device 112, block local or remote services on the client device 112, wipe the client device 112, or perform another remedial action.

Figure 5:
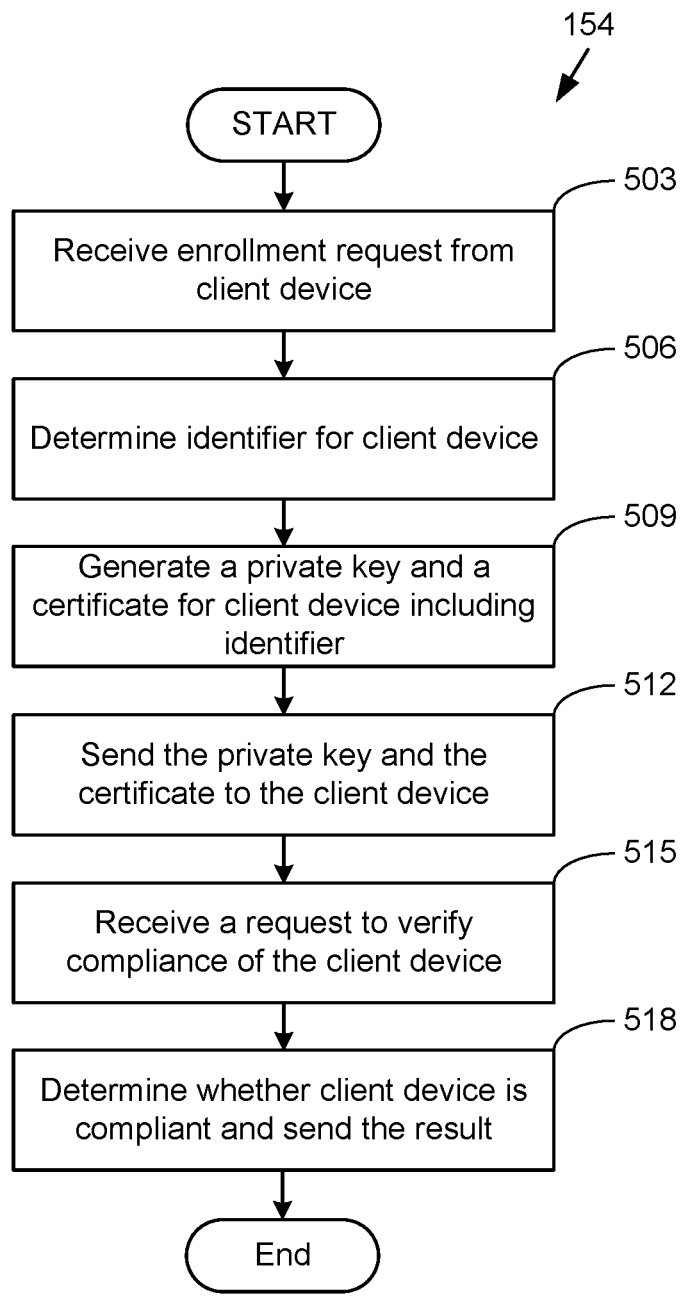
FIG. 5 is a flowchart illustrating examples of functionality implemented as portions of a management service.

Referring next to FIG. 5, shown is a flowchart that provides one example of the operation of a portion of the management service 154. As an alternative, the flowchart of FIG. 5 can be viewed as depicting an example of elements of a method implemented in the management server 106 or the computing environment 203. FIG. 5 illustrates an example of how the management service 154 provides a client device 112 with a certificate including an identifier while enrolling the client device 112.

At step 503, the management service 154 can receive an enrollment request from a management component 179 executed on a client device 112. In one example, when a user signs onto a new client device 112 for a first time, the management component 179 can send an enrollment request to the management service 154.

At step 506, the management service 154 can determine an identifier for the client device. While enrolling the client device 112, the management service 154 can generate the identifier. The identifier can be generated to be unique relative to other identifiers for other client devices 112. The management service 154 can generate a new entry for a managed device 157 for the new client device 112 including the generated identifier as identifier 160.

At step 509, the management service 154 can generate a private key and a certificate for a client device 112. The certificate can include the identifier. The management service 154 can send a request to the certificate authority service 190 to generate the private key and the certificate for the client device 112. The request can include the identifier. The certificate authority service 190 can generate a public key including the identifier and a private key for the client device 112. The certificate authority service 190 can sign the public key with the certificate authority key 196 to generate the certificate.

At step 512, the management service 154 can send the private key and the certificate to the client device 112. The management service 154 can encrypt and transmit the private key and certificate to the client device 112. In one example, the management service 154 manages a secured storage system located on the client device 112. The management service 154 can place the private key and the certificate in a secured storage location of the secured storage system. In another example, the management service 154 uses secure certificate enrollment protocol (SCEP) to move the private key and certificate to the client device 112.

At step 515, the management service 154 can receive a request to verify compliance of the client device 112. The management service 154 can provide a REST API for the identity provider service 127 to submit requests for client device 112 compliance.

At step 518, the management service 154 can determine whether the client device 112 is compliant. In one example, management service 154 sends a request the management component 179 to determine whether the client device 112 complies with the compliance rules 161. The management service 154 can send the result of whether the client device 112 is compliant to the identity provider service 127. Thereafter, the process proceeds to completion.

Figure 6:
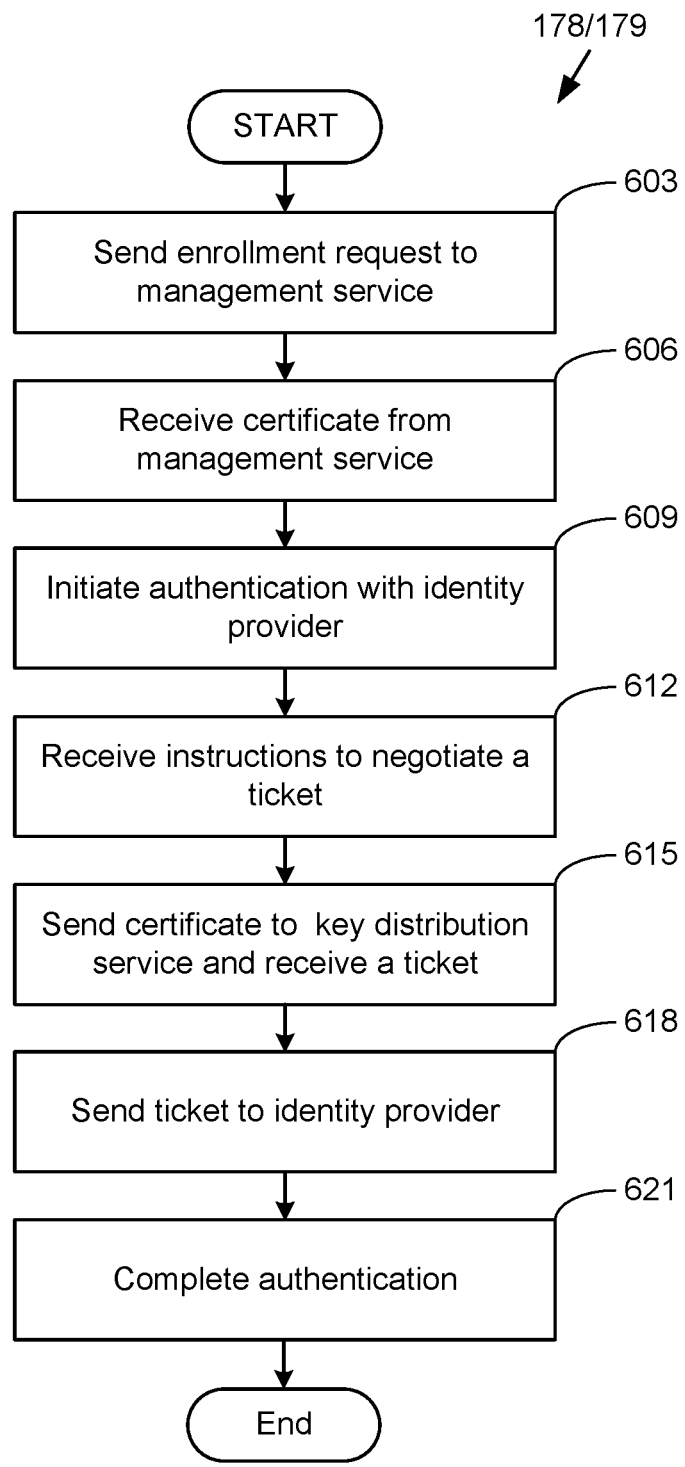
FIG. 6 is a flowchart illustrating examples of functionality implemented as portions of a management component and a client application.

Referring next to FIG. 6, shown is a flowchart that provides one example of the operation of a portion of the client application 178 and management component 179. As an alternative, the flowchart of FIG. 6 can be viewed as depicting an example of elements of a method implemented in the client device 112. FIG. 6 illustrates an example of how the client application 178 and management component 179 can send an identifier corresponding to the client device 112 when authenticating the client device 112.

At step 603, the management component 179 can send an enrollment request to the management service 154. The client device 112 can be preloaded with the management component 179. The management component 179 can be a trusted application executed on the client device 112. In one example, when a user logs into the client device 112 for the first time, the management component 179 can send an enrollment request to the management service 154. If the client device 112 does not have a connection to network 121, the management component 179 can send the request when a connection is established to the network 121 or the next time a user attempts to login to the client device 112 while connected to the network 121.

At step 606, the management component 179 can receive a certificate from the management service 154. The management component 179 can access a secured storage location on the client device 112. The management component 179 can communicate with the management service 154 to transfer files to the secured storage location. The management component 179 can receive the certificate from the management service 154 and store the certificate in the secured storage location as certificate 181.

At step 609, the management component 179 can initiate authentication with the identity provider service 127. A user can attempt to log in to the client device 112 with authentication credentials. The management component 179 can send the authentication credentials to the identity provider service 127 for validation.

At step 612, the management component 179 can receive instructions to negotiate a ticket. The management component 179 can receive a response from the identity provider service 127 requesting the management component 179 to negotiate with a key distribution service 166 for a ticket.

At step 615, the management component 179 can send the certificate 181 to the key distribution service 166. If the certificate 181 is validated by the key distribution service 166, the key distribution service 166 can send a ticket including the identifier to the management component 179. The key distribution service 166 can use a public key associated with the certificate authority 115 to determine whether the certificate 181 from the management component 179 is a valid certificate. If the certificate 181 provided by the management component 179 is valid, the key distribution service 166 can send the ticket to the management component 179 in response to the request from the management component 179.

At step 618, the management component 179 can send the ticket to the identity provider service 127. After the management component 179 receives the ticket from the key distribution service 166, the management component 179 can use the ticket to authenticate with the identity provider service 127. The management component 179 can send the ticket to the identity provider service 127 for authentication. The identity provider service 127 can use the ticket to determine an identifier for the client device 112 by extracting the identifier from the ticket. The management component 179 can wait for a response from the identity provider service 127 regarding whether the management component 179 is authenticated.

At step 621, the management component 179 can complete authentication. As an example, the management component 179 can receive a confirmation of authentication from the identity provider service 127. Once authenticated, one or more client applications 178 can access network resources based on permissions of the authenticated user account and compliance rules 161 associated with the client device 112. The management component 179 can restrict access to a network resource by a client application 178 if the management component 179 determines the client device 112 fails to comply with a compliance rule 161. Thereafter, the process proceeds to completion.

The flowcharts of FIGS. 3-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The identity provider server 103, the management server 106, the key distribution server 109, the client devices 112, the certificate authority 115, the computing environment 203, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The identity provider service 127, the management service 154, the key distribution service 166, the client application 178, the management component 179, the certificate authority service 190, the service application 212, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, at least the following is claimed:

1. A system for assessing compliance of a client device while authenticating a user account comprising:
   a data store comprising executable instructions; and
   at least one computing device comprising at least one processor, wherein the instructions, when executed by the at least one processor, cause the at least one computing device to at least:
   transmit, to the client device, instructions for certificate verification, the instructions comprising a command to transmit a certificate to a key distribution center, the certificate comprising a unique device identifier for the client device, wherein the unique device identifier is assigned by a management service during an enrollment of the client device;
   receive, from the client device, a ticket obtained from the key distribution center, wherein the unique device identifier is embedded in the ticket by the key distribution center based on verification that the certificate is valid;
   extract the unique device identifier from the ticket;
   determine that credentials received from the client device authenticate against the user account;
   transmit, to the management service, a request to verify compliance of the client device with at least one compliance rule, wherein the request comprises the unique device identifier; and
   authenticate the user account for access through the client device.

2. The system of claim 1, wherein the instructions, when executed by the at least one processor, further cause the at least one computing device to at least:
cache the unique device identifier and session data in the data store associated with the user account, the session data comprising a compliance status indicating that the client device complies with at least one compliance rule;
periodically poll a management service to determine an updated compliance status indicating that the client device still complies with the at least one compliance rule; and
update the session data based at least in part on the updated status and the unique device identifier.

3. The system of claim 2, wherein the instructions, when executed by the at least one processor, further cause the at least one computing device to at least:
receive a single sign-on request including a username of the user account from a service provider;
obtain the session data associated with the user account from the data store;
generate a single sign-on token including a current compliance status from the session data that specifies that the client device complies with the at least one compliance rule, the current compliance status being stored in at least one of: a security assertion markup language (SAML) attribute field of the single sign-on token, an OAuth2 token attribute, or an OpenID Connect token attribute; and
transmit the single sign-on token to the service provider.

4. The system of claim 1, wherein the instructions comprise:
a key distribution add-on module is configured to send the command to transmit the certificate to the key distribution center;
a device compliance add-on module is configured to determine that the client device complies with the at least one compliance rule; and
a ticket add-on module is configured to extract the unique device identifier from the ticket and provide the unique device identifier to a plurality of add-on modules.

5. The system of claim 1, wherein the request to verify compliance is transmitted to an application programming interface (API) of the management service.

6. The system of claim 5, wherein:
the data store comprises a shared key and a shared certificate that are shared with the management service;
the shared certificate is included in the request to verify compliance; and
the management service validates the shared certificate using the shared key prior to providing a compliance status indicating that the client device complies with the at least one compliance rule.

7. The system of claim 5, wherein:
an agent on the client device enrolls with the management service prior to sending the credentials to the at least one computing device; and
a plurality of client applications executed on the client device access resources in the data store based at least in part on the user account being authenticated for access through the client device.

8. A non-transitory computer-readable medium embodying instructions for assessing compliance of a client device while authenticating a user account, wherein the instructions, when executed by at least one processor, cause at least one computing device to at least:
transmit, to the client device, instructions for certificate verification, the instructions comprising a command to transmit a certificate to a key distribution center, the certificate comprising a unique device identifier for the client device, wherein the unique device identifier is assigned by a management service during an enrollment of the client device;
receive, from the client device, a ticket obtained from the key distribution center, wherein the unique device identifier is embedded in the ticket by the key distribution center based on verification that the certificate is valid;
extract the unique device identifier from the ticket;
determine that credentials received from the client device authenticate against the user account;
transmit, to the management service, a request to verify compliance of the client device with at least one compliance rule, wherein the request comprises the unique device identifier; and
authenticate the user account for access through the client device.

9. The non-transitory computer-readable medium of claim 8, wherein the instructions, when executed by the at least one processor, further cause the at least one computing device to at least:
cache the unique device identifier and session data associated with the user account, the session data comprising a compliance status indicating that the client device complies with at least one compliance rule;
periodically poll a management service to determine an updated compliance status indicating that the client device still complies with the at least one compliance rule; and
update the session data based at least in part on the updated status and the unique device identifier.

10. The non-transitory computer-readable medium of claim 9, wherein the instructions, when executed by the processor, cause the at least one computing device to at least:
receive a single sign-on request including a username of the user account from a service provider;
obtain the session data associated with the user account;
generate a single sign-on token including a current compliance status from the session data that specifies that the client device complies with the at least one compliance rule, the current compliance status being stored in at least one of: a security assertion markup language (SAML) attribute field of the single sign-on token, an OAuth2 token attribute, or an OpenID Connect token attribute; and
transmit the single sign-on token to service provider.

11. The non-transitory computer-readable medium of claim 8, wherein the instructions comprise:
a key distribution add-on module configured to send the command to transmit the certificate to the key distribution center;
a device compliance add-on module configured to determine that the client device complies with the at least one compliance rule; and
a ticket add-on module configured to extract the unique device identifier from the ticket and provide the unique device identifier to a plurality of add-on modules.

12. The non-transitory computer-readable medium of claim 8, wherein the unique device identifier is stored in a Domain Name Server Subject Alternate Name field in the certificate.

13. The non-transitory computer-readable medium of claim 8, wherein the request to verify compliance is transmitted to an application programming interface of the management service.

14. The non-transitory computer-readable medium of claim 13, wherein a shared key and a shared certificate are shared with a management service, the shared certificate is included in the request to verify compliance, and the management service validates the shared certificate using the shared key prior to providing a compliance status indicating that the client device complies with the at least one compliance rule.

15. A method of assessing compliance of a client device while authenticating a user account, comprising:
- transmitting, to the client device, instructions for certificate verification, the instructions comprising a command to transmit a certificate to a key distribution center, the certificate comprising a unique device identifier for the client device, wherein the unique device identifier is assigned by a management service during an enrollment of the client device;
- receiving, from the client device, a ticket obtained from the key distribution center, wherein the unique device identifier is embedded in the ticket by the key distribution center based on verification that the certificate is valid;
- extracting the unique device identifier from the ticket;
- determining that credentials received from the client device authenticate against the user account;
- transmitting, to the management service, a request to verify compliance of the client device with at least one compliance rule, wherein the request comprises the unique device identifier; and
- authenticating the user account for access through the client device.

16. The method of claim 15, further comprising:
- caching the unique device identifier and session data associated with the user account, the session data comprising a compliance status indicating that client device complies with at least one compliance rule;
- periodically polling a management service to determine an updated compliance status indicating that the client device still complies with the at least one compliance rule; and
- updating the session data based at least in part on the updated status and the unique device identifier.

17. The method of claim 16, further comprising:
- receiving a single sign-on request including a username of the user account from a service provider;
- obtaining the session data associated with the user account;
- generating a single sign-on token including a current compliance status from the session data that specifies that the client device complies with the at least one compliance rule, the current compliance status being stored in at least one of: a security assertion markup language (SAML) attribute field of the single sign-on token, an OAuth2 token attribute, or an OpenID Connect token attribute; and
- transmitting the single sign-on token to service provider.

18. The method of claim 15, wherein:
- a key distribution add-on module is configured to send the command to transmit the certificate to the key distribution center;
- a device compliance add-on module is configured to determine that the client device complies with the at least one compliance rule; and
- a ticket add-on module is configured to extract the unique device identifier from the ticket and provide the unique device identifier to a plurality of add-on modules.

19. The method of claim 15, wherein the unique device identifier is stored in a Domain Name Server Subject Alternate Name field in the certificate.

20. The method of claim 15, wherein the user account is authenticated for access through the client device based on: verification of the certificate, authentication of the credentials, and verification of compliance with the at least one compliance rule.

* * * * *